Oct. 23, 1956  H. H. CLUTE  2,767,551
TANK FILLING FLOAT VALVE STRUCTURE
Filed Oct. 5, 1953
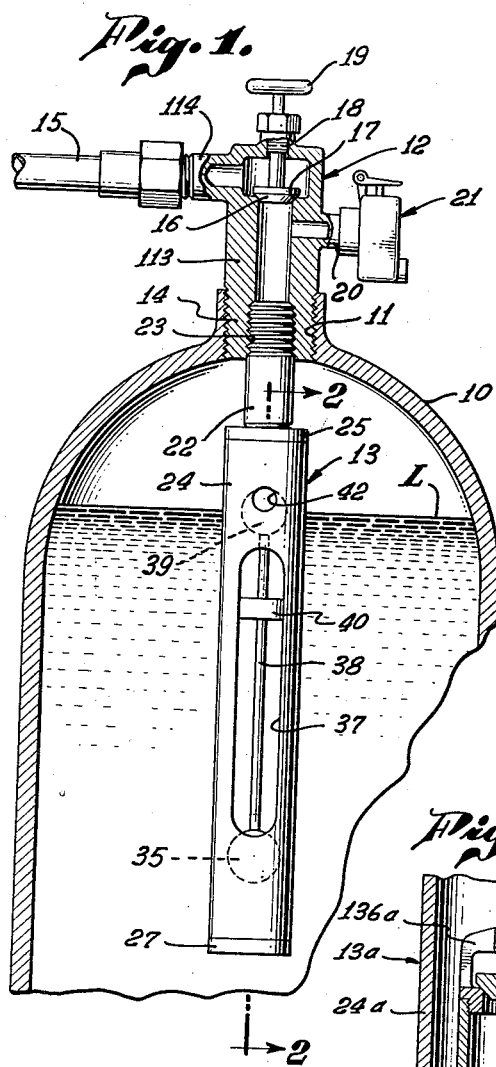
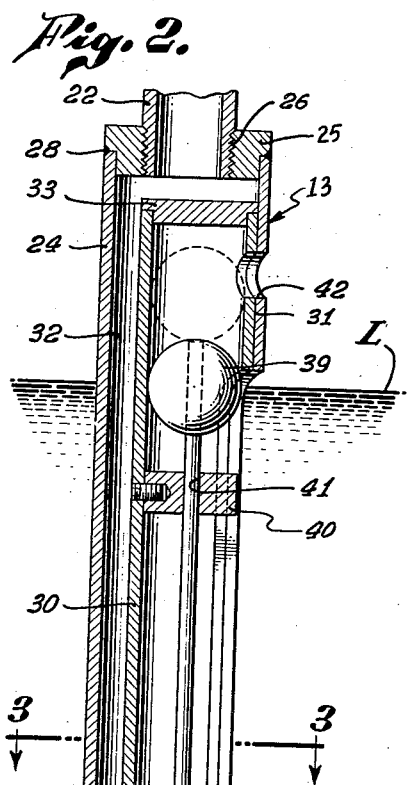
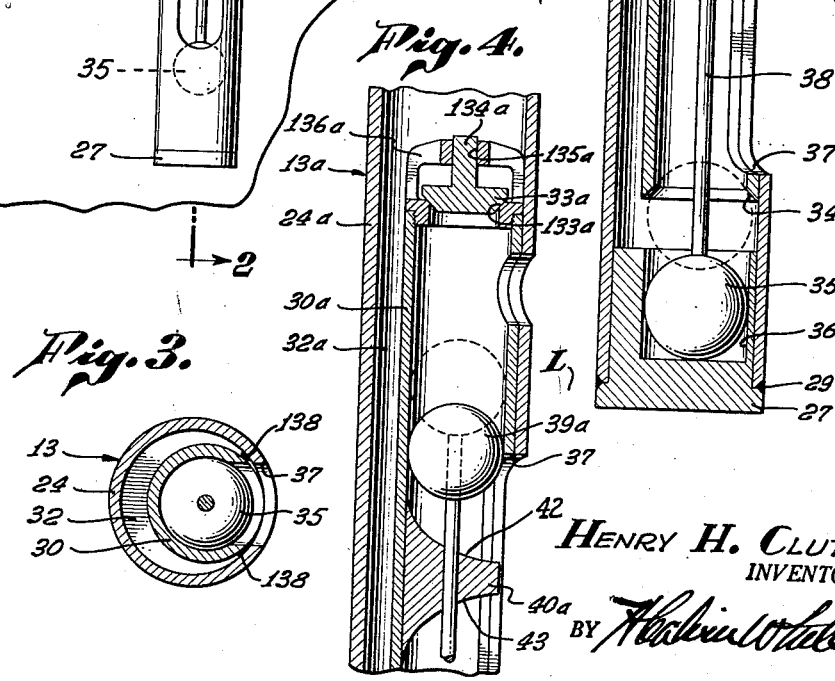
Henry H. Clute,
INVENTOR.
BY
Attorney.

United States Patent Office 2,767,551
Patented Oct. 23, 1956

2,767,551

TANK FILLING FLOAT VALVE STRUCTURE

Henry H. Clute, Los Angeles, Calif.

Application October 5, 1953, Serial No. 384,095

6 Claims. (Cl. 62—1)

This invention relates to improved float controlled valves particularly adapted for controlling the filling of liquefied petroleum gas or other fluids into a tank.

In filling liquefied petroleum gases into a storage tank or other container, it is highly important that a substantial gas or "outage" space be left in the top of the tank, in order that the liquid may be able to expand into that space in the event of a rise in temperature. Accordingly, the general object of the present invention is to provide a float valve unit which will act to automatically stop the filling of such liquefied petroleum gases into a tank upon the attainment of a predetermined liquid level in the tank, to thus assure the maintenance of a proper gas or "outage" space in the top of the tank. Particularly contemplated is a float valve of this type comprising a unit which can be connected into and contained within a conventional tank, and used in conjunction with a filling fitting such as is customarily employed on such a tank. Preferably, the float valve unit is carried by a manually actuated fill valve, with the fill valve and float valve being connectible as a unit into the filling opening of the tank.

To permit insertion of the float valve unit into the tank through a small upper filling opening, the float valve unit is given a small horizontal dimension but may be vertically elongated. Internally, the vertically elongated body of the device, which is preferably a vertically extending tube or pipe, may contain a wall or walls acting to divide the body into two vertical passages, through which fluid entering the tank flows first downwardly and then upwardly to a discharge location communicating with the tank. At the lower ends of these passages, a vertically movable float controlled valve is movable toward and away from a downwardly facing seat, to control the fluid flow through the device. This seat may be formed about the lower end of an inner vertically extending tubular member, which may be mounted eccentrically in the outer tubular body of the device, and serves as the wall for dividing the body into downflow and upflow passages.

The inner automatic valve element is desirably controlled by a float element located in the body of the device above the valve element and at a location exposed to the liquid level in the tank. This float element is desirably connected to the valve element, which may itself be a float member, by a vertically extending rod. Preferably that rod extends upwardly within the inner upflow tube of the device, and may be slidably guided for only vertical movement by passage through a horizontal partition which separates an upper float chamber portion of the inner tube from a lower main portion thereof.

The above and other features and objects of the present invention will be better understood from the following detailed description of the typical embodiment illustrated in the accompanying drawing, in which:

Fig. 1 is a fragmentary vertical section taken through the upper portion of a liquefied petroleum gas tank, provided with a fill valve mechanism embodying the invention;

Fig. 2 is an enlarged fragmentary vertical section taken on line 2—2 of Fig. 1;

Fig. 3 is a horizontal section taken on line 3—3 of Fig. 2; and

Fig. 4 is a fragmentary vertical section through a variational form of float valve unit.

Referring first to Fig. 1, I have shown at 10 a conventional essentially cylindrical tank, into which liquefied petroleum gas or other fluid is to be filled under pressure up to a predetermined liquid level L. At its upper end, tank 10 has a threaded vertically extending filling and dispensing opening 11, into which is connected an upper control valve unit 12. Valve unit 12 carries at its lower end a liquid level responsive automatic float valve 13, which projects downwardly into the tank.

The upper valve unit 12 is of essentially conventional construction including a valve body 113 having a lower tubular externally threaded vertically extending portion 14 connected into the upper threaded opening 11 of the tank. Body 113 has at one side a laterally projecting tubular portion 114, to which a filling line 15 may be removably connected, for filling liquefied petroleum gas into the tank. The flow of fluid into the tank from line 15 is controlled by a valve element 16 seating against a seat 17 in body 113 and threadedly connected at 18 into the body. An upper rotary handle 19 controls the opening and closing movement of valve 16.

At a second side, valve body 113 has a second laterally projecting portion 20, to which is connected a relief valve 21 acting to allow escape of fluid from within the valve body in the event of attainment of an excessive fluid pressure. To cite a typical example, this relief valve may be constructed to discharge fluid from the valve body and tank at a pressure of about 375 p. s. i., while the filling pressure in line 15 is ordinarily about 175 p. s. i., and the gas pressure in the upper portion of tank 10 when filled is about 160 p. s. i.

Float control valve 13 comprises a vertically elongated unit of a diameter not greater than, and preferably smaller than, the internal diameter of threaded opening 11 in the tank, so that unit 13 may be withdrawn upwardly through the tank opening with upper valve 12. Unit 13 is connected to the lower end of body 113 of valve 12 by a tubular threaded nipple 22, which is threadedly connected at its upper end into an internally threaded bore 23 within lower tubular portion 14 of body 113.

Unit 13 includes an outer vertically extending rigid cylindrical tube or pipe 24, partially closed at its upper end by an annular head 25 into which the lower end of nipple 22 is threadedly connected at 26. At its lower end, tubular body 24 is closed by a bottom closure 27. The upper head 25 and bottom closure 27 are rigid and fastened in fixed relation to tube 24, as by welding at 28 and 29.

Contained within outer tubular body 24, I provide a second vertically extending but smaller diameter cylindrical tube or pipe 30, which is mounted eccentrically in outer tube 24, so that the two tubes 24 and 30 directly engage at one side 31, while being radially spaced apart along a substantial portion of their circular extents at 32. The upper end of inner tube 30 is closed by an upper transverse head 33, while the lower end of tube 30 is open and forms a downwardly facing annular valve seat 34. In filling tank 10, fluid flows downwardly from nipple 22 through space 32 between tubes 24 and 30, and then flows upwardly into the open lower end of inner tube 30 past valve seat 34. Such fluid flow is controlled by a vertically movable spherical ball valve 35, which is movable upwardly to a closed position of annular engagement with seat 34. In its lower open position, ball valve 35 is received within a recess 36 in the upper side of bottom closure 27, so that the ball valve is shielded sufficiently from the fluid to prevent closing of the valve solely as a result of the fluid movement.

At their engaging sides, tubes 24 and 30 have a pair of registering correspondingly shaped vertically elongated side openings 37, through which fluid is allowed to discharge laterally from within tube 30 into tank 10. About the edges of these openings, the space between the two tubes 24 and 30 is closed in some manner, as by welding at 138, which welding may also serve the function of securing the two tubes rigidly together. This welding prevents communication of the discharge openings 37 with the space 32 between the two tubes, except through the lower open end of inner tube 30.

Valve 35 is connected in fixed relation to a vertically elongated and vertically extending rigid rod 38, which extends upwardly within tube 30 to a point of rigid attachment to an upper spherical ball float 39. Float 39 may be only slightly smaller than the internal diameter of inner tube 30, to be freely vertically movable therein. Rod 38 is slidably guided for only vertical movement by a transverse partition 40, which is fastened in fixed relation to tube 30, and contains a vertical bore 41 through which rod 38 slidably extends. Partition 40 is imperforate and extends entirely across the horizontal extent of tube 30, to serve a secondary function of protecting float 39 against contact with and movement by the liquid flowing through the lower portion of tube 30.

The liquid level within the upper float chamber portion of tube 30 above partition 40 changes in correspondence with the liquid level changes in the tank 10, since the tank liquid is free to flow into the upper float chamber through upper portions of side openings 37 in the two tubes 24 and 30. To assure prompt changes in the liquid level within the float chamber, tubes 24 and 30 may have a second pair of registering side openings 42, spaced above the upper ends of openings 37, and acting to allow free gas flow into and out of the upper portions of the float chamber. The two tubes 24 and 30 are of course sealed together about their openings 42 in the same manner that they are sealed by welding 138 about openings 37.

As will be understood, the filling of liquid into tank 10 through float valve unit 13 is controlled by vertical movements of the bodily movable valve and float unit comprising valve 35, rod 38, and upper float 39. This unit has an overall specific density which is less than the specific density of the liquid being filled into the tank, so that the unit tends to float on the liquid, and automatically moves valve 35 upwardly to a closed position of engagement with seat 34 upon the attainment of a predetermined liquid level in tank 10. That predetermined level will typically be the level indicated at L, at which upper float 39 is partially submerged in the liquid. To attain the desired buoyancy, valve 35 is preferably itself a float element, to assist the upper float element 39 in raising the unit. For best results, both of these elements 35 and 39 may comprise hollow spheres, typically formed of a suitable resinous plastic material adapted to withstand the liquid being used. For example, these hollow spheres may be formed of polymerized methyl methacrylate, such as that sold by E. I. du Pont de Nemours under the trade name Lucite.

In filling a tank 10 provided with the above described valve mechanism, the filling line 15 is first connected to fitting projection 14, valve 16 is then opened, and liquefied petroleum gas or other fluid is filled under pressure from line 15 through the valve mechanism and into the tank. This fluid passes downwardly along space 32 within the float valve unit 13, and then passes upwardly into inner tube 30 and out lateral openings 37 into the tank. When the liquid within the tank reaches the level L, the buoyancy of elements 35 and 39 shifts valve 35 upwardly to prevent the filling of further liquid into the tank. The float valve unit thus prevents filling of the tank above the level L, so that a gas space is always maintained in the upper portion of the tank, to allow for expansion of the liquid within the tank as a result of temperature changes. Such allowance for liquid expansion is extremely important where the liquid being used is liquefied petroleum gas.

After completion of the filling process, valve 16 may be closed to retain the filled fluid within the tank. The fluid may then be dispensed from the tank under the control of valve 16 by reverse flow through valve units 13 and 12 and to a dispensing line 15. Upon such reverse fluid flow through the float valve unit 13, the fluid entering tube 30 through apertures 37 exerts a downward opening force on valve 35, allowing the fluid to pass seat 34 and flow upwardly through passage 32 to the upper valve 12.

When the tank is empty, the valves 12 and 13 may be removed from tank 10 as a unit, by reason of the formation of lower valve unit 13 of the illustrated vertically elongated configuration. Such removal of the valves permits their ready repair or replacement, and facilitates access to the interior of tank 10.

It has been found desirable that the fluid passing areas of the portions of side ports 37 below partition 40 be large as compared with the horizontal or transverse area of the lower open end of inner tube 30 at the location of seat 34. Such enlargement of the fluid passage at ports 37 as compared with the passage at seat 34 allows a slowing of the liquid velocity upon filling of the tank, and before the liquid discharges from float valve unit 13 into the tank. This enlargement of the liquid float passage has the effect of assuring more accurate response of the float unit to the liquid level, and of preventing premature rising and closing of the valve 35. Preferably, the fluid passing area of the portions of ports 37 located lower than partition 40 is at least about 6 times as great as the fluid passing area within valve seat 34.

Fig. 4 illustrates fragmentarily a variational form of float valve unit 13a, which may be utilized in lieu of the unit 13 of Fig. 1. This second form of valve unit 13a may be considered as substantially identical to unit 13 except as to the differences which are specifically brought out in Fig. 4. One difference resides in the fact that horizontal partition 40a within inner tube 30a of Fig. 4 presents upper and lower surfaces 42 and 43 which curve progressively toward liquid passing opening 37 in the inner tube and outer tube 24a. These curving surfaces 42 and 43 direct fluid smoothly between the interior of inner tube 30a and the space at the side of unit 13a, to reduce the turbulence set up by the fluid movement. As a result, the action of float 39a to liquid level changes in the tank may be improved.

A second change incorporated in the Fig. 4 form of the invention resides in the provision of a check valve 33a in the upper end of inner tube 30a, in place of the imperforate upper wall 33 shown in Fig. 2. This check valve 33a seats downwardly against an annular seat member 133a, which is rigidly connected into the upper end of tube 30a. Stem 134a of check valve 33a is guided for vertical reciprocation by passage through a vertical opening 135a in a fluid passing cage or transverse web member 136a attached to seat member 133a.

During filling of fluid into the tank 10 through valve unit 13a of Fig. 4, check valve 33a automatically seats downwardly against member 133a, to require passage of the filling fluid downwardly through space 32a between tubes 24a and 30a, for flow upwardly into the upper end of tube 30a in the manner described previously. When, however, gas is to be withdrawn from the upper end of the tank, the gas may pass upwardly past check valve 33a and directly into the upper valve unit 12, without the necessity for passage through space 32a. As a result, gas may be withdrawn from the upper end of the tank without the unwanted discharge of liquid from the tank. To achieve this purpose, valve element 33a and its seat 133a should of course be located above the level L at which the float valve unit limits filling. It will be understood that the valve 33a or its equivalent might be positioned differently, as long as it provided for one way communication between the upper gas space within tank 10 and the upper valve unit 12 or another gas dispensing fitting.

I claim:

1. An automatic fill valve for connection into a liquefied petroleum gas tank, comprising a vertically extending and vertically elongated tubular outer body connectible at its upper end to a filling fitting, a tubular inner body extending vertically within said outer body at an eccentric location adjacent a side thereof, said inner body being open at its lower end and closed at its upper end and dividing said outer body interiorly into a first passage radially between the two bodies through which fluid flows downwardly from said filling fitting, and a second passage within the inner body through which fluid flows upwardly from a lower end of the first passage, outlet openings in the side walls of said tubular bodies through which fluid from said second passage discharges laterally into the tank, a downwardly facing valve seat extending about said open lower end of the inner body, a valve seating upwardly against said seat and controlling fluid flow from the first passage into the second, and a float in the outer body above said valve and seat exposed to the fluid in said tank and controlling actuation of said valve to close the valve upon attainment of a predetermined liquid level in the tank.

2. An automatic fill valve as recited in claim 1, including a rod interconnecting said valve and float and extending vertically within said second passage.

3. An automatic fill valve as recited in claim 2, including a partition within said inner body separating said second passage from an upper float chamber portion of the inner body within which said float is received, said rod extending through and being guided for vertical movement by said partition.

4. An automatic fill valve as recited in claim 3, including a bottom closure at the lower end of said outer body containing a recess into which said valve is movable downwardly in opened condition to a position in which the valve is shielded against closing actuation by fluid flowing toward and past said seat.

5. An automatic fill valve assembly for connection into a liquefied petroleum gas tank, comprising a vertically extending and vertically elongated tubular outer body connectible at its upper end to a filling fitting, a tubular inner body extending vertically within said outer body, said inner body dividing said outer body interiorly into a first passage radially between the two bodies through which fluid flows downwardly from said filling fitting, and a second passage within the inner body through which fluid flows upwardly from a lower portion of the first passage, outlet means in the side walls of said tubular bodies through which fluid from said second passage discharges laterally into the tank, a downwardly facing valve seat extending about a lower portion of said second passage, a valve seating upwardly against said seat and controlling fluid flow from the first passage into the second, and a float exposed to the fluid in said tank and controlling actuation of said valve to close the valve upon attainment of a predetermined liquid level in the tank.

6. An automatic fill valve as recited in claim 5, including means forming a recess beneath said valve seat into which said valve is movable, downwardly to an open position in which the valve is shielded against upward displacement by fluid passing from said first passage to the second, said float means comprising a float spaced vertically from said valve, there being a partition between said valve and float, and there being a rod extending vertically between said valve and float and through said partition and movable vertically to actuate the valve in response to vertical movement of the float.

References Cited in the file of this patent

UNITED STATES PATENTS

| | | |
|---|---|---|
| 247,668 | Loftus | Sept. 27, 1881 |
| 562,267 | Albin | June 16, 1896 |
| 1,502,061 | Sampson | July 22, 1924 |
| 2,230,741 | Browning | Feb. 4, 1941 |
| 2,303,179 | Sitton et al. | Nov. 24, 1942 |
| 2,492,123 | Williams | Dec. 20, 1949 |
| 2,500,936 | Dick | Mar. 21, 1950 |